Oct. 25, 1960     R. C. FERGASON     2,957,726
LOAD SUPPORTING STRUCTURE AND ATTACHMENT MEANS FOR A TRACTOR
Filed June 18, 1953     6 Sheets-Sheet 1

Inventor
Rector L. Fergason
by Kimball S. Wyman
Attorney

Oct. 25, 1960 R. C. FERGASON 2,957,726
LOAD SUPPORTING STRUCTURE AND ATTACHMENT MEANS FOR A TRACTOR
Filed June 18, 1953 6 Sheets-Sheet 2

Oct. 25, 1960 R. C. FERGASON 2,957,726
LOAD SUPPORTING STRUCTURE AND ATTACHMENT MEANS FOR A TRACTOR
Filed June 18, 1953 6 Sheets-Sheet 5

Inventor
Rector C. Fergason
by Kimball S. Wyman
Attorney

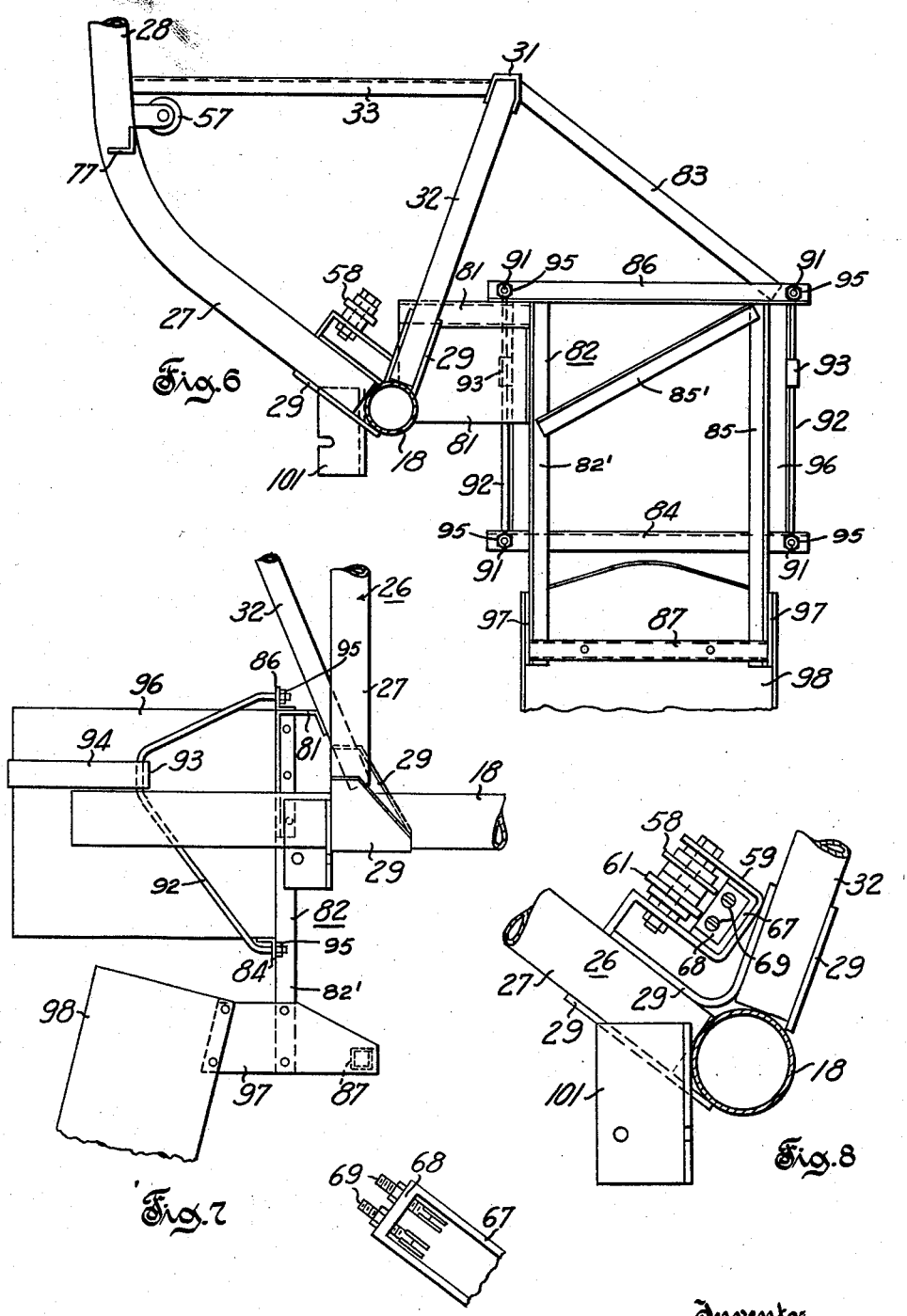

United States Patent Office 2,957,726
Patented Oct. 25, 1960

2,957,726

LOAD SUPPORTING STRUCTURE AND ATTACHMENT MEANS FOR A TRACTOR

Rector C. Fergason, Gadsden, Ala., assignor to Allis-Chalmers Manufacturing Company, Milwaukee, Wis.

Filed June 18, 1953, Ser. No. 362,526

3 Claims. (Cl. 298—1)

This invention relates generally to a tractor mounted receptacle for receiving harvested material delivered thereto from a harvester unit propelled by the tractor, and is more particularly concerned with providing features of receptacle construction and mounting designed to improve the attachment and detachment, the attainment of maximum loads, and the ease of operation including complete discharge of the harvested material confined therein.

In harvesting bulky crops such as cotton, the use of a large capacity receptacle, hereinafter called a basket, is desirable to minimize interruptions of the picking operations. Further, the basket should be of a design such that it can be automatically loaded to maximum capacity without manual aid, and such as will effectively separate dirt and small particles of trash from the picked cotton being delivered to the basket. Still further, it is also desirable that the mounting and lifting mechanism for the receptacle be such as will effect complete discharge of the material confined therein without manual aid and with a minimum application of power. Also, the tilting mechanism and power means should be combined for coaction in a manner effectively utilizing a uniform application of power to afford a high torque for initiating tilting of the basket and a smoothness of operation conducive to minimizing impact forces and an excessive stressing of parts. In addition, it is highly desirable that the basket construction and mounting be such that it can readily be attached and detached substantially as a unit, and preferably by one person.

With the foregoing in mind, the present invention is concerned with and has as its principal object the provision of an improved basket construction, mounting, and/or tilting mechanism incorporating novel features designed to accomplish one or more of the objectives set forth in the preceding paragraph.

Another object of this invention is the provision of an improved basket construction and mounting embodying a novel correlation of parts including a cover structure which effectively functions as a chute for directing material into a wagon or truck disposed adjacent the basket, and which automatically opens and closes by gravity as the basket moves from its normal material receiving position to its dumping position, and vice versa, respectively.

A further object of this invention is concerned with the provision of an improved basket mounting and tilting mechanism incorporating features of construction and combination designed to minimize power requirements for the tilting operation and to effectively eliminate the impact stressing of parts in moving the basket from an elevated dumping position to a lower material receiving position.

An additional object of the present invention is directed toward an improved basket construction and mounting embodying parts constructed and combined for coaction in a novel manner enabling the basket, the basket supporting frame and the tilting mechanism to be readily attached to or removed from a conventional tractor with a minimum of time and effort, and preferably by only one person.

Still another object of the present invention is the provision of a basket construction, mounting and tilting mechanism which can be readily attached to or removed from the tractor substantially as a unitary structure, said unitary structure including an essential harvesting part combined in a novel manner eliminating the provision of a special protective device for the front end of the tractor power plant.

The novel aspects of apparatus suitable for achieving the foregoing and other objects and advantages will become readily apparent from a consideration of the following disclosure of a preferred embodiment of the invention. Accordingly, this invention may be considered as comprising the various features of construction, combination, and/or subcombination hereinafter more particularly set forth in the detailed description and appended claims. Reference being also had to the accompanying drawings, and wherein:

Fig. 6 is an enlarged partial section taken on line VI—VI of Fig. 5 showing details of the tank mounting;

Fig. 7 is a side elevation of the structure shown in Fig. 6;

Fig. 8 is another enlarged partial section taken on line VIII—VIII of Fig. 5 showing details of the connection between the reciprocal power device and the flexible power transmitting means for tilting the basket; and Fig. 9 is a view of the forward portion of the channel shaped piston rod of the ram as seen when looking down thereonto in a direction generally normal to the web thereof.

Figure 1:
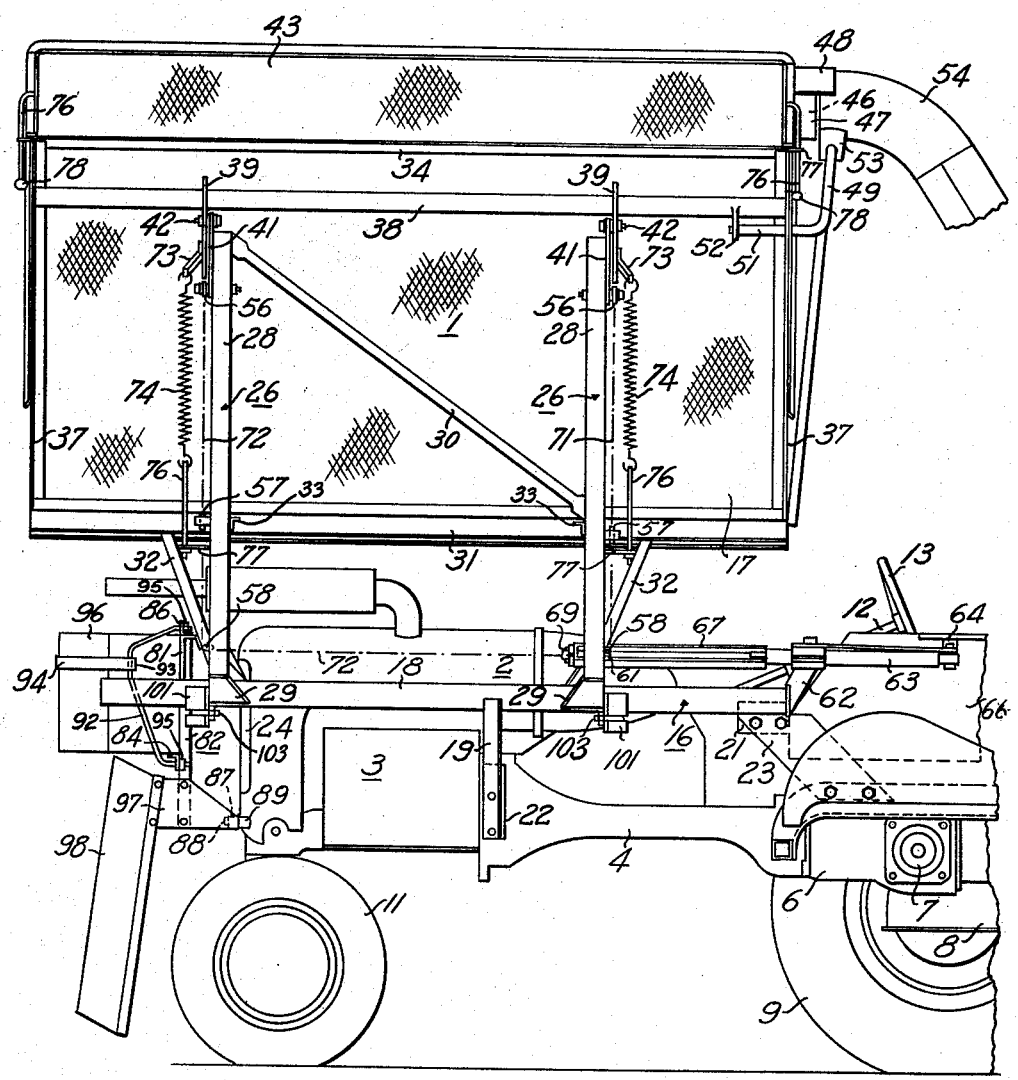
Fig. 1 is a side elevation of a tractor mounted harvester structure embodying the invention with the nearside rear wheel removed in order to better show the coaction of parts.
Figure 2:
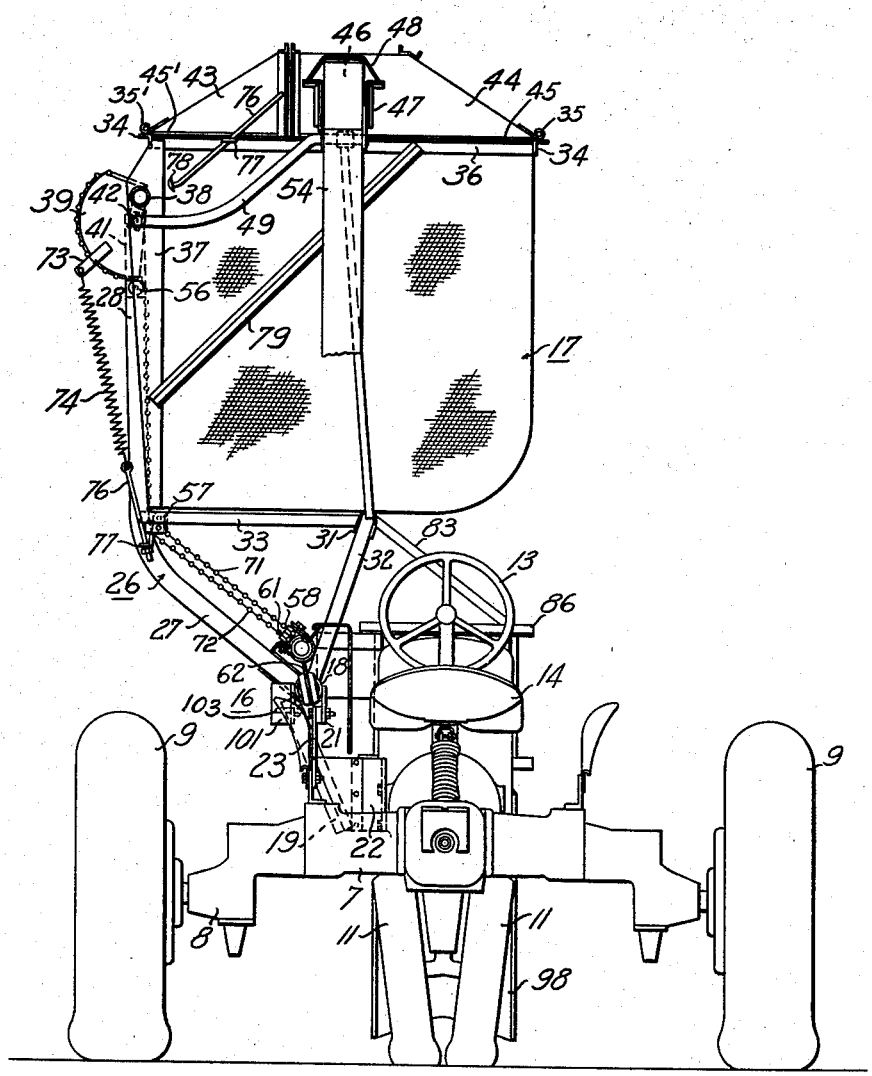
Fig. 2 is a rear elevation of the tractor mounted structure shown in Fig. 1 with certain of the parts omitted or broken away in order to better show details of combination.

Referring to Figs. 1 and 2 of the drawings, a unitary receptacle attachment 1 is shown as attached to a conventional tricycle type tractor 2 including an engine or power unit 3 at the front end thereof, a torque tube 4, a transmission housing 6 connected to the rear end of torque tube 4 and merging with a forward side midportion of a transverse rear axle structure 7 terminating at its opposite ends in final drive housings 8 rotatably supporting the traction wheels 9. The dirigible front wheels 11 are operatively connected with a steering column 12 terminating in a wheel 13 disposed within easy reach of an operator seated at the station on seat 14. Power is transmitted from the engine 3 to the traction wheels 9 through conventional shafts and gearing enclosed in the torque tube 4, transmission housing 6, rear axle structure 7 and the final drive housings 8, it being understood that the tractor is provided with the usual engine, clutch, brake and transmission controls (not shown) as a knowledge of the exact construction, arrangement and operation of these parts is unnecessary for a complete understanding of the present invention.

The unitary receptacle attachment comprises an elongated main frame structure 16 tiltably mounting a basket 17. The frame structure 16 includes an elongated rigid base section or member 18 having longitudinally spaced portions thereof provided with a pair of laterally facing attaching brackets 19 and 21 detachably secured, as by means in the form of bolts or the like, to complementary tractor carried bracket or attachment means 22 and 23, respectively. The attaching brackets 19 and 21 serve as center and rear supports respectively for the frame structure 16. The base member 18 is thus positioned to extend horizontally alongside the narrow body of the tractor, that is, the portion of the tractor extending forwardly from the rear axle structure 7 in generally parallel proximate relation thereto. The tractor power unit 3 is provided with the usual cooling radiator 24 disposed immediately in advance thereof and the base member 18 extends forward to a point somewhat in advance of the radiator 24. The frame structure includes a receptacle support comprising a pair of similar elongated support members or elements 26. Each element 26 has a lower portion 27 fixedly welded to the member 18 to extend outward relative to said tractor body to a height somewhat above the body (note Fig. 2) and an upper portion 28 which forms an obtuse angle with the lower portion 27. The upper portions are disposed in fore and aft alignment and parallel to a generally vertical plane extending longitudinally of the base member. If desired, the connection between the lower portions 27 and the base member 18 may be suitably reinforced by gusset plates or the like, 29. In addition, the elements 26 may be longitudinally braced by a diagonal member 30.

The main frame also includes a receptacle bottom support, best shown in Figs. 1, 2, 3 and 6, comprising a pair of rigid struts 32 extending upward from fore and aft portions of base section 18 in fixed diverging relation to the lower portions 27 of the structural elements 26 to a height above the tractor body, an elongated rigid member 31 fixedly attached to upper portions of the rigid struts 32 to extend longitudinally of the tractor body in elevated relation thereto, and cross braces 33 fixedly uniting the elongated rigid member 31 with portions of the structural elements 26 that are disposed generally opposite the elongated rigid member 31. It will be appreciated, from reference to Fig. 2, that the cross braces 33 extend horizontally inward from the junction between upper and lower portions 27 and 28 to meet the diverging struts 32. Consequently, the elongated rigid basket support member 31 is disposed laterally opposite and offset from the junction between lower and upper portions 27, 28 and toward the tractor body. The elongated rigid member 31 extends forwardly beyond the front end of the tractor to a point somewhat beyond the forward end of the base member 18.

The receptacle or basket 17 includes a rigid top or upper side structure comprising the longitudinal and transverse topside frame elements 34 and 36, respectively, a pair of vertical nearside end elements 37, and a longitudinal tubular member 38 fixedly secured, as by welding, to upper portions of the end elements 37. Tubular member 38 is provided with mounting and tilting means in the form of a pair of similar cam segments 39 fixed thereon to project outward from longitudinally spaced portions thereof conforming with the longitudinal spacing of the elements 26, these cam segments being pivotally detachably secured to attaching parts 41 fixed on upper end portions of the elements 26. Consequently, the cam segments and basket are mounted for vertical swinging movement about a first common axis afforded by the pivot means 42 generally parallel to the base member 18, and the vertical depth of the basket is such that when disposed in its normal material receiving or loading position, its bottom side seats on the elongated rigid bottom support member 31 in overlapping relation to the elongated narrow tractor body.

The basket 17 is provided with a two part cover structure comprising complementary door sections 43 and 44 having their remote outer side margins 45, 45′ hingedly attached at 35 and 35′ to the laterally opposite top edge frame portions 34, which define the top opening of the receptacle. The hinge elements 35 and 35′ present second and third axes generally parallel to each other and to the first pivot axis 42 to afford divergent swinging movement of the sections 43 and 44 relative to each other. The door section 43 has similar end walls of triangular shape whereas the section 44 is larger and has similar end walls consisting of a triangular portion merging with a rectangular portion, the latter portion being provided with a material receiving opening 46 defined in part by similar vertical side flanges 47 and a top hood on flange 48 extending outward from the basket beyond the side flanges 47. In addition, basket 17 is provided with an elongated conveyer or spout support 49 having an offset end portion 51 journaled in the adjacent vertical end frame element 37 and in a bracket 52 projecting from tubular element 38, these journals being coaxially aligned with the pivot components 42. The opposite end of support 49 is also offset and journaled in a pair of bracket elements 53 depending from laterally opposite sides of a spout 54, it being understood that the conveying conduit or spout 54 is operatively connected with a harvesting unit (not shown), and that harvested material such as cotton is conveyed through the spout and into the basket through the opening 46.

The elements 26 of the main frame are each provided with power transmitting guide means, such as the rollers or sprockets 56, 57 and 58. Sprockets 56 and 57 constitute upper guide means with sprocket 56 disposed immediately adjacent the associated cam segment 39 and sprocket 57 disposed substantially at the junction between the upper and lower portions 27 and 28. Sprockets 58 constitute lower guide means and are disposed adjacent the junction between the inner portion 27 and the base member 18. The guides 58 overlie the base member 18 in general alignment longitudinally thereof. It will be noted that the upper and lower guide means on each of the structural elements 26 lie approximately in the vertical plane which extends transversely of the base section 18 and through the cam segments 39. Referring also to Fig. 8, it will be noted that the inner portion 27 of the rear element 26 and the associated frame element 32 fixedly mount a U-shaped bracket 59, the latter mounting the guide 58 on the rear element 26 and also a similar guide 61 disposed alongside the guide 58 in direct longitudinal alignment with the lower guide 58 on the front element 26. A rear portion of main frame member 18 is provided with an upward and outward (Fig. 2) projecting bracket 62 which supports a power transmitting device, such as the reciprocable hydraulic ram 63 in operatively fixed relation thereto, the ram being additionally supported by a part 64 extending outward and downward from the flanged top portion of a shield 66 extending vertically upward from axle structure 7 between the power device 63 and the operator's seat 14.

Figure 3:
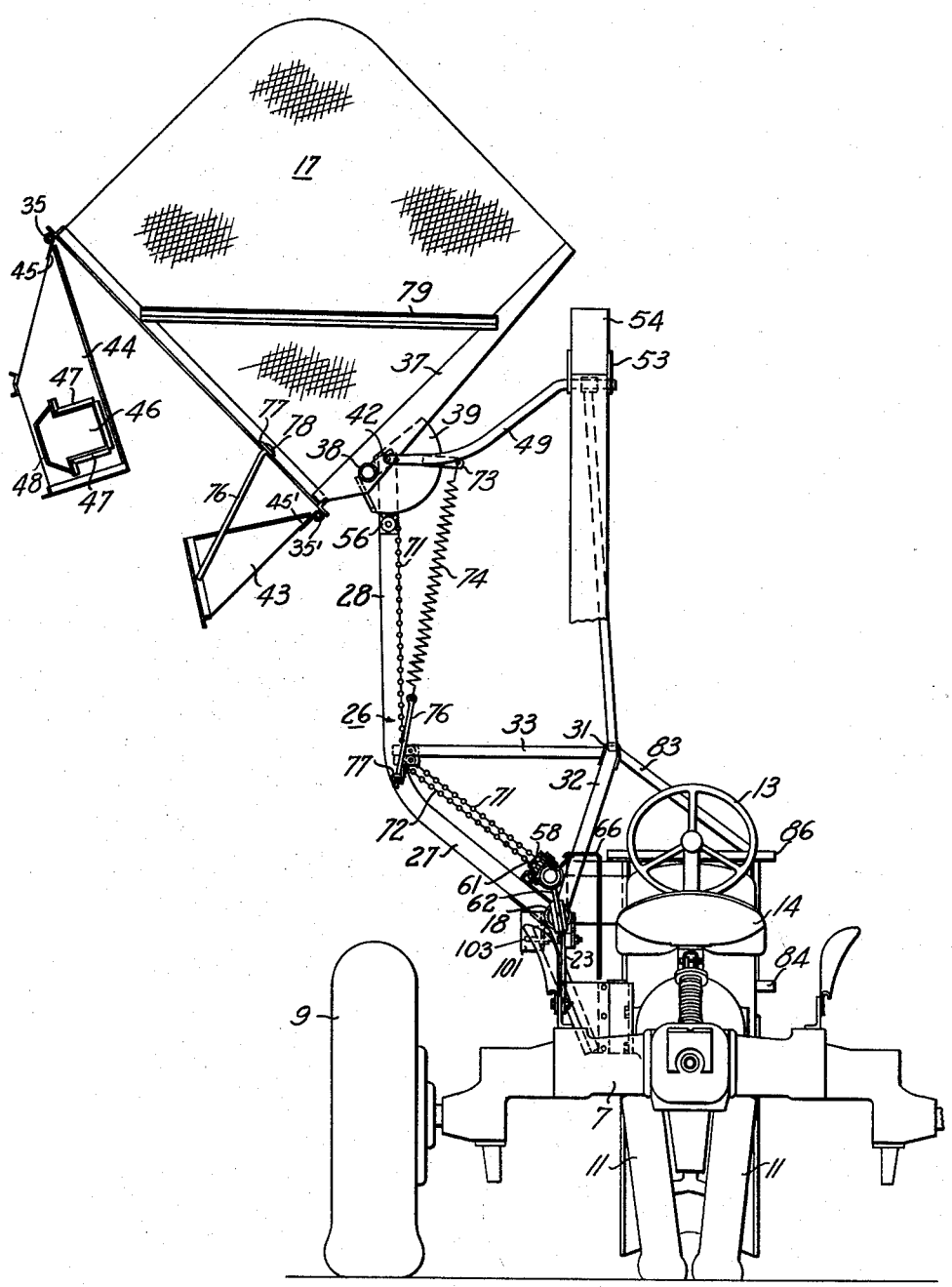
Fig. 3 is a view similar to Fig. 2 showing the basket raised to its elevated dumping position.

Ram 63 (note Fig. 9) is provided with a U-shaped piston rod portion 67 having its forward end guidingly supported by the U-shaped bracket 59 when the ram is in its fully collapsed condition. Piston rod 67 is provided with a forward generally vertical end wall 68 mounting a pair of similar cable or chain attaching elements 69 for separate limited adjustment longitudinally of the piston rod. In the illustrated construction, the guides 58 and 61 which are mounted on bracket 59 in overlying relation to piston rod 67, are chain sprockets and a pair of chains 71, 72 each have an end attached to one of the elements 69, the chain 71 passing upward over the rear side of the sprocket 58 and over the guides 57 and 56 on the rear element 26 with its other end attached to a top side portion of the associated cam segment 39. The chain 72 similarly passes over sprocket 61 and then forward around the lower guide 58 on the front element 26 and over the vertically aligned guides 57 and 56 with its other end similarly attached to the cam segment on the front element 26. Manipulation of the adjusting elements 69 enables the ram 63 to exert an equal torque on both cam segments 39, it being understood that the tractor is provided with a source of pressure fluid (not shown) and that the flow of pressure fluid to and from the ram 63 is suitably controlled in a conventional manner, also not shown since the details of a satisfactory hydraulic system are common knowledge and are nonessential for a full understanding of the present invention. Consequently, it should suffice to know that upon the admission of pressure fluid to the ram, the latter expands moving the piston rod 67 forward which in turn pulls the chains 71, 72 around the guides 56, 57, 58 and 61 effecting a tilting of the basket 17 about the common axis of pivot components 42, as indicated in Fig. 3. In other words, expansion of ram 63 moves the basket from its normal material receiving position shown in Figs. 1 and 2 to its elevated dumping position shown in Fig. 3.

Each cam segment 39 is provided with a projecting arm 73 and a pair of tension springs 74, one for each segment, have their upper ends connected to the arms 73 and their lower ends connected to a fixed spring tension adjusting part 76 mounted on a bracket 77 projecting from the associated frame element 26. The arms 73 and parts 76 are disposed in overcenter relationship, that is, the relationship is such that when the basket is in its normal material receiving position spring tension aids the ram in initiating a tilting movement of the basket, that when the basket is in its elevated dumping position and empty, spring tension will initiate a return movement of the basket toward its normal position, and that as the basket approaches its normal position spring tension provides an oppositely acting cushioning action eliminating an impact stressing of parts. In this connection it is to be noted that the center of gravity of the basket which is on the tractor side of the axis of tilt when the basket is in its normal position shifts laterally to the other side of said axis, i.e., to a side outward from the tractor as the basket approaches its dumping position. Further, the centers of gravity of the door sections 43, 44 are similarly located relative to their respective hinge axes and similarly shift laterally to the other side of said hinge axes as the basket approaches its dumping position. Consequently, the door sections open and close by gravity action and the end walls of the sections coact with the uniting walls thereof to form chutes for directing cotton or the like into a wagon or truck disposed alongside the tractor. In addition, means are provided for limiting the opening movement of section 43, this means comprising a rod 76 having one end pivoted to a normally inner edge of the rear end wall and passing freely through an opening in a bracket 77 fixedly attached to the basket cross frame member 36, the other end of the rod having an enlargement 78 thereon sufficient to prevent its passage through the opening in bracket 77. If desired, the basket frame structure may be additionally braced by a diagonal element 79 connecting vertical end element 37 with rear cross member 36.

Referring again to Fig. 1 and also to Figs. 6 and 7, it will be seen that the frame element 32 projecting inward and upward from base member 18 adjacent front element 26 is provided with a plate 81 projecting from the tractor side thereof in advance of the radiator 24. The tractor edge portion of plate 81 is fixedly secured to a generally rectangular frame 82, which includes side members 82' and 85 and top and bottom cross members 86 and 87, respectively. The frame 82 has it top side remote from plate 81 additionally supported by a generally rigid element 83 having its lower end fixed to top cross member 86 at a point above side member 85 and its upper end fixed to a forward portion of the basket bottom support member 31. The frame 82 is reinforced by a diagonal brace 85 which extends from an intermediate portion of side member 82' to the junction of top cross member 86 with side member 85. Frame 82, intermediate its top and bottom ends is provided with a transverse cross member 84 generally parallel to the top cross member 86 and to the bottom cross member or front support 87, the latter being provided with a pair of laterally spaced holes for receiving cap screws or the like 88 fixing the lower portion of the frame to a pair of internally threaded bosses 89 disposed at the front of the tractor below the radiator 24. It will be appreciated that the front support 87 is mounted on a forward portion of section 18 to extend laterally thereof and in facing relation to the front of the tractor. The opposite ends of cross members 84 and 86 are provided with vertically aligned holes 91 freely receiving the threaded ends of a pair of similar tank supporting rods 92 having intermediate portions engaging the hooked ends 93 of a tank engaging band 94, the tightening of the nuts 95 on rods 92 acting to compress the tank 96 firmly against the forward side of frame 82. The bottom portion of frame 82 is provided with a pair of laterally spaced forwardly extending bracket portions 97 mounting a depending shield 98 for the front dirigible wheels 11. The tank 96 and frame 82 are a unitary part of the main frame, and when the latter is attached to the side of a tractor as previously described, the tank and frame function effectively as a shield for the radiator 24.

Figure 4:
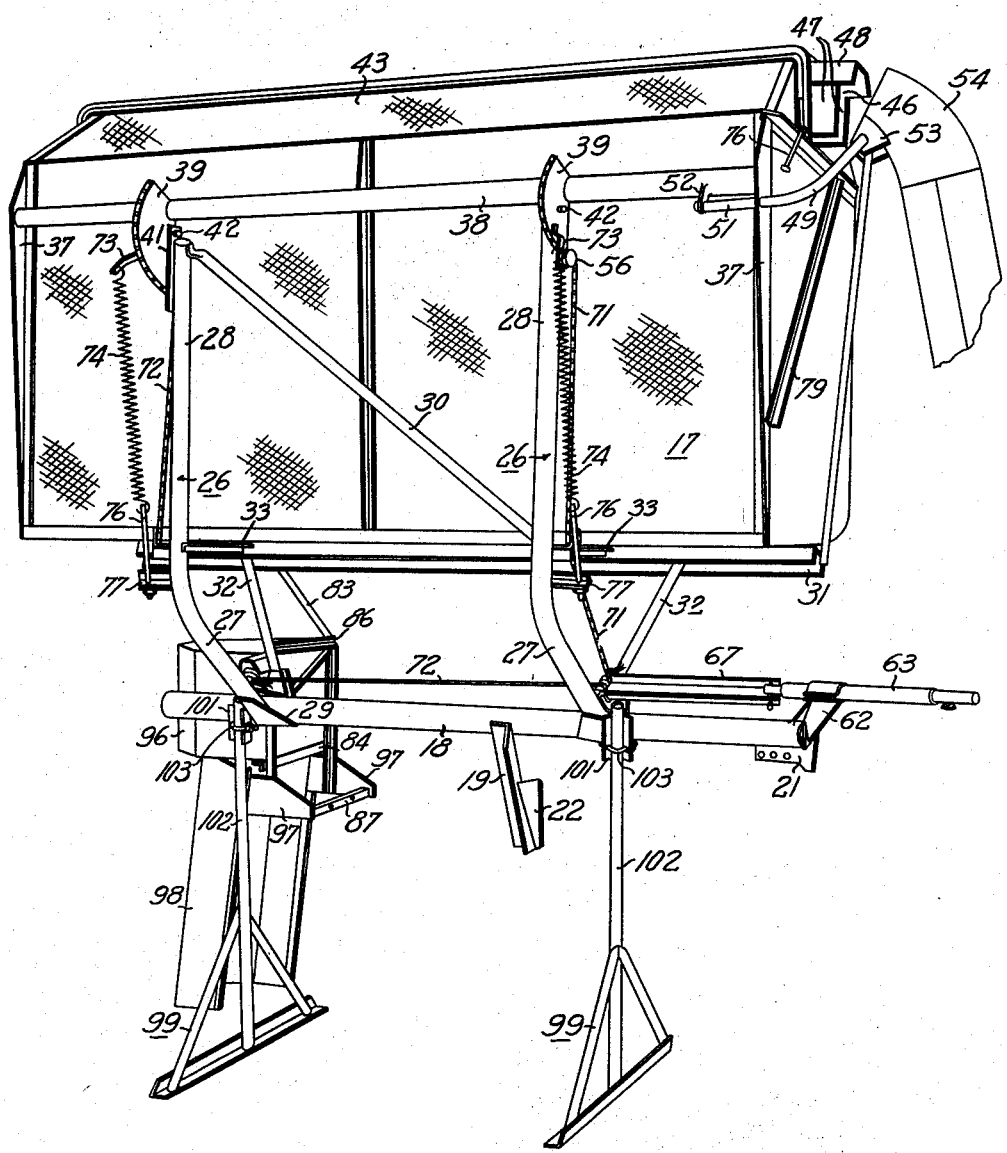
Fig. 4 is a detached assembly perspective showing the harvester structure mounted on support standards for ready attachment to a side of the tractor.

All that has to be done to detach the unitary receptacle structure comprising the basket mounting and tilting mechanism from the tractor is to remove the cap screws 88 from the bosses 89, disconnect the spout section 54 from the associated picker unit spout (not shown), detach the fluid supply conduits (not shown) from the ram 63, disconnect the rear ram support 64 from the shield 66, and then disconnect the brackets 19 and 21 from the complementary tractor carried brackets 22 and 23, respectively. In order to make this a one man operation, there is provided pedestal means in the form of a pair of similar support standards 99 (note Fig. 4) and the main frame member 18 is provided at longitudinally spaced portions thereof with a pair of outwardly facing coupling parts 101 fixed thereon adjacent the junctions therewith of the inner portions 27 of the elements 26. Coupling parts 101 are shaped to conform with the vertical post portions 102 of the standards 99, the coupling parts 101 being fixedly securable to the post portions of the standards by detachable connecting means in the form of bracket components or U-bolts 103. Therefore, when proceeding as indicated above, before detaching the brackets 19 and 21 from the tractor brackets 22 and 23, respectively, the standards 99 are positioned adjacent the tractor with the tractor side of their post portions disposed within the coupling parts 101 whereupon the U-bolts are tightened to firmly secure base member 18 thereto. When this has been done, the brackets 19 and 21 may be disconnected from the tractor brackets 22 and 23, respectively, and the tractor driven away (note Fig. 5) leaving the unitary harvesting structure including the tank and shield elements supported on the standards as indicated in Fig. 4 independently of the tractor.

Figure 5:
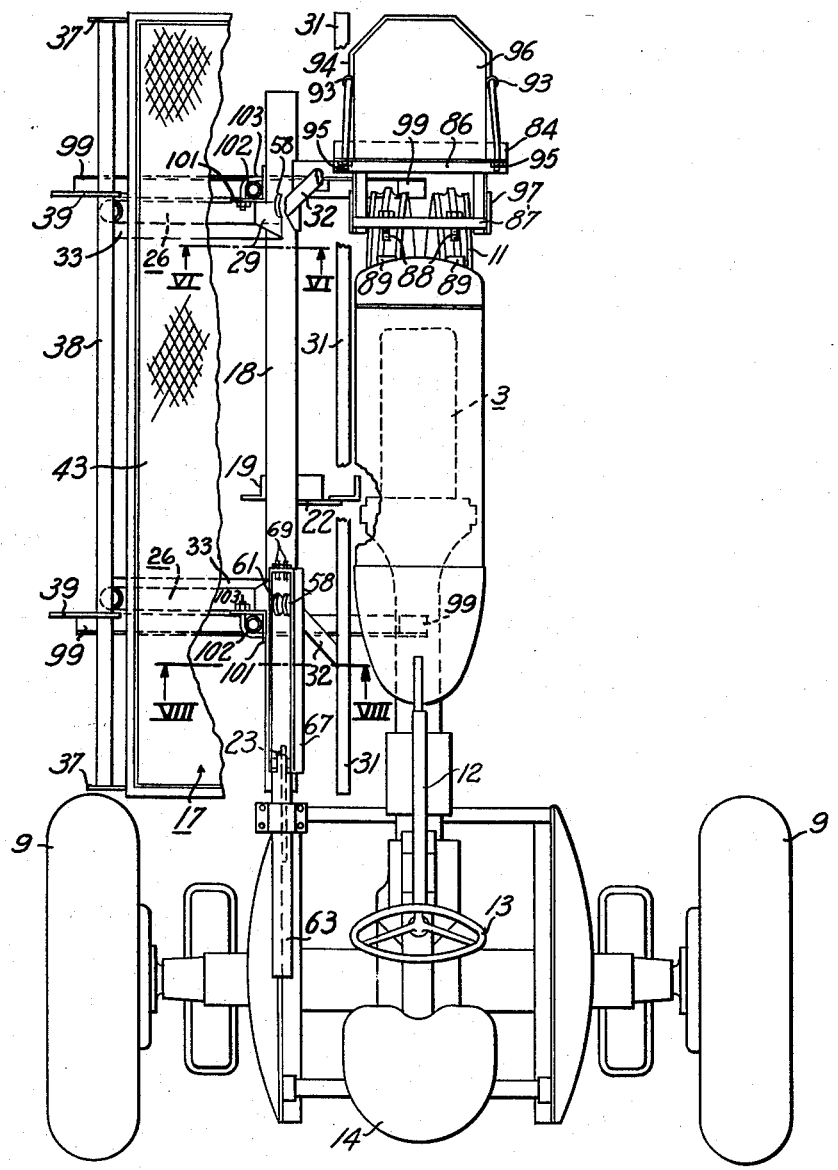
Fig. 5 is a plan view of the assembly shown in Fig. 4 with a tractor disposed alongside thereof in position for ready attachment of the supporting structure to the body of the tractor.

When it is desired to reattach this unitary structure, the tractor is driven alongside the standards and below the receptacle to the approximate position shown in Fig. 5, whereupon a slight further movement of the tractor forward from the position indicated, brings the brackets 19, 21, and the cap screw receiving holes in the lower cross member 87 of frame 82 into attaching relation to the complementary tractor parts 21, 22 and 89, respectively. Completion of the attaching procedure is essentially the reverse of previously described detaching operation and is carried out in an obvious manner. When attached, as shown in Figs. 1 and 2, it is apparent that an operator sitting on seat 14 is afforded a substantially unobstructed forward looking view through the space above the body of the tractor and beneath the bottom side of the basket and the bottom basket support. Further, it will be apparent that the design of the basic frame structure is such that supporting standards may be effectively used in both attaching and detaching operations since the tractor can be readily driven away from or into an attaching relation thereto thus making such operations a truly one man procedure.

Referring again to Figs. 1, 2 and 4, it will be noted that the basket is relatively long, narrow and fairly deep, and that the material receiving inlet is disposed adjacent the rear top side thereof. Consequently, inblown material entering through spout 54 travels lengthwise thereof toward the forward end thus affording a considerable distance of travel which results in an effective gravity separation of foreign material from the harvested crop, this being particularly true when the harvested crop is of relatively light weight such as cotton bolls. Further, the longitudinal sides of the basket are spaced apart laterally less than the angle of repose of harvested cotton bolls, and therefore the basket fills or loads uniformly from the front end thereof, that is, the end opposite the material receiving opening 46. This insures a uniform loading of the basket without manual aid, and when it is desired to unload the basket, the contents thereof are effectively completely guidingly discharged into a truck or wagon disposed alongside the tractor. As previously indicated, this effective guided discharge is insured by the gravity opening and construction of the door sections 43 and 44.

In addition, the correlation of the overcenter balance springs and tilting mechanism results in an effective utilization of tilting power and eliminates or minimizes the impact stressing of parts usually resulting from the gravity return of a basket to its normal material receiving position. Furthermore, the herein disclosed design of the basic frame structure enables the basket and mounting comprising the basic supporting structure to be readily removed and attached as a unit by one person. However, if desired for any reason, the basket 17 may readily be detached from the main supporting frame simply by detaching the chains 71, 72 and the springs 74 from the cam segments 39, and then detaching the cam segments from the parts 41 whereupon the basket can be readily lifted from its bottom support.

In general terms, the herein disclosed apparatus comprises an attachment frame including a rigid beam element as represented by the base member 18, and rigid parallel arms as represented by the support members 26, which are secured to longitudinally spaced portions, respectively, of the beam element 18 in transversely extending relation thereto. Each of the arms 26 has a first portion 27 secured to one side of the beam element 18 in radially extending relation thereto, and a second portion 28 of greater length than the first portion 27 and extending angularly from the first portion 27.

A pair of post structures, as represented by the standards 99, are connected, respectively, in supporting relation with the beam element 18 at longitudinally spaced portions, respectively, of the beam element, and extend radially therefrom in directions opposite to the directions of the second arm portions 28. The post structures have supporting surface engaging foot sections at the free ends thereof, as represented by the feet at the lower ends of the posts 102, and they are operative, independently of the tractor, to sustain the beam element 18 in a horizontal position at a predetermined height above said supporting surface, thereby permitting the tractor to be driven into an attaching position wherein a body portion of the tractor forwardly of the rear wheels 9 extends along a side of the beam element 18 opposite to the arms 26.

Longitudinally spaced fastening means for detachably securing the beam element 18 to said body portion of the tractor in a fixed position while the tractor is in said attaching position are represented by the attaching brackets 19, 21 and associated bolts.

Pivot means, as represented by the pins 42 and associated parts, connect a material storage receptacle, such as the basket 17, at its top opening with the free ends of the second portions 28 of the arms 26 on an axis generally parallel to the beam element 18.

Stop means on the attachment frame, as represented by the elongated member 31 and associated braces 32, 33, cooperate with the receptacle upon swinging movement of the latter about the axis of the pins 42 in one direction to produce a stable condition of the attachment frame, receptacle and post structure in which the beam element is maintained in the mentioned horizontal position independently of the tractor and in which the receptacle is in a loading position in overlying relation to the beam element 18.

Actuating means on the attachment frame for swinging the receptacle about its pivot axis between the mentioned loading position and an unloading position in overlying relation to the arms 26 are represented by the cams 39 and chains 71, 72. The ram 63 on the beam element 18 represents an actuating device which is operatively connected with flexible force transmitting members as represented by the chains 71, 72.

In view of the foregoing it should now be obvious that the apparatus herein disclosed for purposes of illustration is capable of inherently fulfilling and accomplishing all of the objects and advantages hereinbefore pointed out. Therefore, while the described apparatus constitutes a preferred construction for practicing the invention, it should be understood that it is not intended to limit the protection to the exact details of construction and/or combination herein disclosed as various modifications within the cope of the appended claims may occur to persons skilled in the art.

It is claimed and desired to secure by Letters Patent:

1. For use with a tractor having an elongated body supported on front and rear wheels, an attachment frame comprising a rigid beam element and rigid, parallel arms secured to longitudinally spaced portions, respectively, of said beam element in transversely extending relation thereto, each of said arms having a first portion secured to one side of said beam element in radially extending relation thereto and a second portion of greater length than said first portion extending angularly from said first portion, a plurality of post structures connected, respectively, in supporting relation with said beam element at longitudinally spaced portions, respectively, of said beam element and extending radially therefrom in directions opposite to the directions of said second arm portions, said post structures having supporting surface engaging foot sections at their free ends and being operative, independently of said tractor, to sustain said beam element in a horizontal position at a predetermined height above said supporting surface, thereby permitting said tractor to be driven into an attaching position wherein a body portion of said tractor forwardly of said rear wheels extends along a side of said beam element opposite to said arms; longitudinally spaced means for detachably securing said beam element to said body portion of said tractor in a fixed position while said tractor is in said attaching position; a material storage receptacle having side and bottom walls and a top opening opposite said bottom wall; pivot means connecting said receptacle adjacent said top opening thereof with the free ends of said second arm portions on an axis generally parallel to said beam element; stop means on said attachment frame cooperable with said receptacle upon swinging movement of the latter about said axis in one direction to produce a stable condition of said attachment frame, receptacle, and post structure in which said beam element is maintained in said horizontal position independently of said tractor and in which said receptacle is in a loading position in overlying relation to said beam element; and actuating means on said attachment frame for swinging said receptacle about said axis between said loading position and an unloading position in overlying relation to said arms.

2. The combination set forth in claim 1 wherein said actuating means comprises an actuating device mounted on said beam element; a pair of cam segments mounted on longitudinally spaced portions of said receptacle about said axis; a pair of flexible force transmitting members each connected at one end to said actuating device and trained at their opposite ends, respectively, over said cam segments; and guide means for said force transmitting members secured to said arms of said attachment frame.

3. The combination set forth in claim 1 and a two part cover structure for said receptacle including complementary cover sections each having an outer side margin; means hingedly mounting said outer side margins on laterally opposite top edges of said receptacle to afford divergent swinging movement of said sections relative to each other about pivot axes extending in the longitudinal direction of said beam element, said sections having their centers of gravity offset laterally from their respective pivot axes to afford gravity opening of said sections as said receptacle is swung into said unloading position; and stop means limiting the swinging movement of the one of said sections which is in closest proximity to said receptacle pivot means.

References Cited in the file of this patent

UNITED STATES PATENTS

| | | |
|---|---|---|
| 787,934 | Morgan | Apr. 25, 1905 |
| 831,428 | Guiry | Sept. 18, 1906 |
| 1,600,385 | Manley | Sept. 21, 1926 |
| 1,725,624 | Dixon | Aug. 20, 1929 |
| 1,985,373 | Johnson | Dec. 25, 1934 |
| 2,072,728 | Cederstrom | Mar. 2, 1937 |
| 2,234,599 | Johnson | Mar. 11, 1941 |
| 2,395,411 | Kittel | Feb. 26, 1946 |
| 2,399,718 | Baker et al. | May 7, 1946 |
| 2,401,152 | Hagen | May 28, 1946 |
| 2,413,873 | Hume | Jan. 7, 1947 |
| 2,440,770 | Hagen | May 4, 1948 |
| 2,518,317 | Hilblom | Aug. 8, 1950 |
| 2,518,465 | Hagen et al. | Aug. 15, 1950 |
| 2,527,369 | Meyer | Oct. 24, 1950 |
| 2,558,951 | Hagen et al. | July 3, 1951 |
| 2,606,676 | Dempster | Aug. 12, 1952 |
| 2,628,729 | Borchers | Feb. 17, 1953 |
| 2,672,247 | Jewett | Mar. 16, 1954 |
| 2,697,005 | Hagen et al. | Dec. 14, 1954 |

FOREIGN PATENTS

| | | |
|---|---|---|
| 64,644 | Norway | Apr. 28, 1947 |